United States Patent
Taylor

(10) Patent No.: US 12,049,414 B2
(45) Date of Patent: Jul. 30, 2024

(54) COMPOSITION AND METHOD FOR WATER CONDITIONING IN SPAS

(71) Applicant: Silk Water Solutions Inc., Surrey (CA)

(72) Inventor: Colin Frank Taylor, Chilliwack (CA)

(73) Assignee: Silk Water Solutions Inc., Surrey (CA)

( * ) Notice: Subject to any disclaimer, the term of this patent is extended or adjusted under 35 U.S.C. 154(b) by 0 days.

(21) Appl. No.: 17/529,227

(22) Filed: Nov. 17, 2021

(65) Prior Publication Data

US 2023/0150849 A1    May 18, 2023

(51) Int. Cl.
| | |
|---|---|
| C02F 1/66 | (2023.01) |
| C02F 1/68 | (2023.01) |
| C02F 5/10 | (2023.01) |
| C11D 1/66 | (2006.01) |
| C11D 3/10 | (2006.01) |
| C11D 3/20 | (2006.01) |
| C02F 103/42 | (2006.01) |

(52) U.S. Cl.
CPC ............... *C02F 1/66* (2013.01); *C02F 1/68* (2013.01); *C02F 5/105* (2013.01); *C11D 1/66* (2013.01); *C11D 3/10* (2013.01); *C11D 3/2075* (2013.01); C02F 2103/42 (2013.01); C02F 2209/06 (2013.01); C02F 2303/04 (2013.01); C02F 2303/22 (2013.01)

(58) Field of Classification Search
CPC .. C02F 1/54; C11D 3/34; C11D 3/336; C11D 3/48
See application file for complete search history.

(56) References Cited

U.S. PATENT DOCUMENTS

| | | | | |
|---|---|---|---|---|
| 9,115,014 B1 * | 8/2015 | Taylor | ...................... | C11D 3/34 |
| 10,081,957 B2 * | 9/2018 | Taylor | ...................... | C11D 3/36 |
| 10,253,514 B2 * | 4/2019 | Taylor | ...................... | C02F 1/58 |
| 10,829,951 B2 * | 11/2020 | Taylor | ...................... | C11D 3/34 |
| 2003/0062315 A1 * | 4/2003 | Cornelius | ................. | C02F 5/10 |
| | | | | 210/698 |
| 2008/0035580 A1 * | 2/2008 | de Rijk | .................. | A01N 59/06 |
| | | | | 210/764 |
| 2016/0083276 A1 * | 3/2016 | Taylor | ...................... | C11D 3/48 |
| | | | | 252/181 |
| 2017/0167152 A1 * | 6/2017 | Taylor | ...................... | C02F 5/105 |
| 2019/0031540 A1 | 1/2019 | Taylor | | |
| 2019/0234091 A1 * | 8/2019 | Taylor | .................. | E04H 4/1281 |
| 2023/0150849 A1 * | 5/2023 | Taylor | ...................... | C02F 1/68 |
| | | | | 210/749 |

FOREIGN PATENT DOCUMENTS

| | | |
|---|---|---|
| CA | 2886476 | 5/2014 |
| CA | 2864785 | 9/2015 |
| WO | 01/21536 | 3/2001 |

OTHER PUBLICATIONS

International Search Report and Written Opinion of the International Searching Authority completed Nov. 15, 2022, in International Patent Application No. PCT/IB2022/058207, 9 pages.

* cited by examiner

*Primary Examiner* — Mark Eashoo
*Assistant Examiner* — M. Reza Asdjodi
(74) *Attorney, Agent, or Firm* — Lowe Graham Jones PLLC

(57) ABSTRACT

A water conditioning composition includes water, at least one gluconate compound, at least one carbonate compound, a non-ionic preservative, and a citrate compound. For example, the composition can include 87-95 wt. % water, 0.5 to 1.5 wt. % gluconate compound, 3 to 8 wt. % carbonate compound, 0.5 to 1.5 wt. % non-ionic preservative, and 0.5 to 2.5 wt. % citrate compound.

17 Claims, No Drawings

COMPOSITION AND METHOD FOR WATER CONDITIONING IN SPAS

FIELD OF THE INVENTION

The present invention is directed to the area of recreational water conditioning. The invention is also directed to compositions, resolution of problems, and methods for use for water conditioning. This invention will allow any commercial chlorine generator to operate with least chemical deposit on the electrolytic cell plates.

BACKGROUND OF THE INVENTION

Pools, spas, and hot tubs require approved regular chemical maintenance of water for hygiene and to prevent, inhibit, or reduce the buildup of stains, mineral deposits, biofilms (including bacterial growths), and the like. These chemical water treatments, however, can dry or irritate the skin of users, produce chemical odors, and produce other deposits on the filters and walls of the pool, spa, or hot tub.

It is desirable to provide water conditioning treatments that reduce or prevent dry, itching, or irritated skin, reduce or prevent chemical odors, or reduce or prevent deposits on the filters or other portions of the pool, spa, or hot tub, including the piping reticulation. Preferably, a water conditioning treatment performs two or more of these functions. In addition, it is desirable that the water conditioning treatment be performed on a weekly, or less frequent basis, and that the water be suitable for use soon after treatment. This formulation further avoids ingredients that can deposit on the electrodes of saltwater cartridges, improving their effectiveness is maximized.

BACKGROUND

Known water treatment original formulations, such as described in U.S. Pat. Nos. 9,115,014, 10,081,957, 10,253,514 and 10,829,951, were designed to provide water conditioning to address and control the added problems of skin irritation and odor from the chemicals used to control microbial growth and produce useable water quality.

Phosphate salts are well known for their capacity to perform as pH buffers. A blend of phosphate and other salts was successfully used to produce a balanced effective control of the pH of the pool, spa, or hot tub. This blend also had the added ability to reduce chemical odor and produce soft skin sensation. In commercial water treatment, however, there now exists improved technical development in the production of in situ chlorine, from water containing dissolved sodium chloride. This system used for water disinfection, is now frequently used in pool, spa, or hot tub. The system employs electrochemical ionization of sodium chloride using metal electrodes to produce free chlorine in the water. These metal electrodes accumulate surface phosphate deposit in the ionization process, requiring physical cleaning to maintain efficiency. A preferred resolution to this problem is to remove the phosphate from the water, as described and claimed in the present invention.

SUMMARY OF THE INVENTION

Potentiometric analysis of known water treatment original formulations shows specific inflection points when titrated with a standard acid. These reveal the characteristic behavior of the blend and its buffering capacity. To replace the original blend, non-phosphate buffer solutions with similar inflection point characteristics were assembled in a new blend, and evaluated both chemically and as used in pools, spas, and hot tubs. The analysis of the new blend demonstrated similar potentiometric results and the pH buffering capacity was the same. Actual usage in pool, spa, or hot tub showed reliable results and the blend performed all the required maintenance functions including aesthetic removal of odor. The new blend also performed well in systems that use saltwater for the electrochemical production of chlorine. There are no reports of fouling of the electrolytic cell plates.

One embodiment is a water conditioning composition, consisting essentially of water, at least one gluconate compound, at least one carbonate compound, at least one bicarbonate compound, and a non-ionic preservative.

Another embodiment is a composition, comprising 87-95 wt. % water; 0.5 to 1.5 wt. % gluconate compound, 3 to 8 wt. % carbonate compound; 0.5 to 1.5 wt. % non-ionic preservative and 0.5 to 1.5 wt. % citrate compound. In at least some embodiments, the composition consists essentially of these recited components.

Yet another embodiment is a water conditioning composition, comprising 1 part gluconate compound; 4 to 10 parts carbonate compound; 0.3 to 2 parts non-ionic preservative; and 0.5 to 3 parts citrate compound. In at least some embodiments, the composition consists essentially of these recited components.

In any of the preceding compositions, the gluconate compound can be sodium gluconate. In any of the preceding compositions, the carbonate compound can be sodium carbonate. In any of the preceding compositions, the non-ionic preservative can be methylisothiazolinone. In any of the preceding compositions, the citrate compound can be sodium citrate.

DETAILED DESCRIPTION OF THE PREFERRED EMBODIMENT

The present invention is directed to the area of water conditioning. The present invention is also directed to compositions, solutions, and methods for water conditioning.

In at least some embodiments, a composition for water conditioning includes at least one gluconate compound, at least one carbonate compound, a non-ionic preservative, and at least one citrate compound. In at least some embodiments, the composition for water conditioning consists essentially of at least one gluconate compound, at least one carbonate compound, a non-ionic preservative, and a citrate compound. It will be understood, however, that other non-essential components, such as dyes, scents, or the like, which do not contribute to the conditioning of water can also be included in the composition. In at least some embodiments, the composition for water conditioning consists essentially of a gluconate compound, a carbonate compound, a non-ionic preservative and a citrate compound.

In at least some embodiments, the composition may be in the form of an aqueous solution. Preferably, all of the components of the composition are completely dissolved in the aqueous solution.

Any suitable gluconate compound can be used. Examples of suitable gluconate compounds include sodium gluconate, potassium gluconate, gluconic acid, or any combination thereof. Although these gluconate compounds are usually derived from D-gluconic acid, it will be understood that compounds derived from L-gluconic acid can also be used. In at least some embodiments, the gluconate compound is an alkali metal gluconate and is preferably sodium gluconate.

The gluconate compound can act as a chelating or sequestering agent to coordinate or bind with metal ions. In at least some embodiments, the gluconate compound chelates or sequesters metal ions, such as iron or copper ions, within the water of the pool, spa, or hot tub. In at least some embodiments, the gluconate compound, together with other components of the composition, may produce a "softness" of the water arising, at least in part, due to the chelating or sequestering of metal ions, such as iron or copper ions.

Any suitable carbonate can be used. Examples of suitable carbonate compounds include sodium carbonate, sodium bicarbonate, potassium carbonate, or any combination thereof. In at least some embodiments, the carbonate compound is an alkali metal carbonate and is preferably sodium carbonate. In at least some embodiments, the composition does not include calcium carbonate.

The carbonate compound can act as a water softening agent to coordinate or bind with metal ions such as calcium, magnesium, and the like. In at least some embodiments, the carbonate compound can also act as a buffering agent. The carbonate compound may also reduce or inhibit the corrosive effects of chlorine or bromine added to the water of the pool, spa, or hot tub.

The non-ionic preservative can be any suitable preservative compound that does not form cations or anions when in aqueous solution. Examples of the non-ionic preservative include, but are not limited to, methylisothiazolinone (available commercially as LINCOCIDE N from the Lincoln MFG-USA), Methylchloroisothiazolinone, or the like. The non-ionic preservative can have bactericidal properties and is preferably biodegradable and preferably does not release formaldehyde. Preferably, the non-ionic preservative is completely soluble in water at the concentration provided in the aqueous form of the composition.

Any suitable citrate compound can be used. Examples of suitable citrate compounds include sodium citrate, potassium citrate or any combination thereof.

In at least some embodiments, the composition does not include a metasilicate compound. In at least some embodiments, the composition does not include a sulphate compound. In at least some embodiments, the composition does not include a silver compound. In at least some embodiments, the composition does not include a preservative that can produce anions, cations, or any combination thereof in an aqueous solution. In at least some embodiments, the composition does not include calcium. In at least some embodiments, the composition does not include phosphates.

In at least some embodiments, the composition includes 87-95 wt. % water, 0.5 to 1.5 wt. % gluconate compound, 3 to 8 wt. % carbonate compound, 0.5 to 1.5 wt. % non-ionic preservative, and 0.5 to 1.5 wt. % citrate buffer. In other embodiments, the amount of water is varied outside this range, but the proportions of the gluconate compound, carbonate compound, non-ionic preservative, and citrate compound relative to each other remain the same. In at least some embodiments, the composition includes 89-93 wt. % water, 0.5 to 1.2 wt. % gluconate compound, 4 to 6 wt. % carbonate compound, 0.7 to 1.2 wt. % non-ionic preservative, and 1 to 2 wt. % citrate compound.

In at least some embodiments, the composition includes a ratio, by weight, of 1 part gluconate compound to 4 to 10 parts (or 5 to 7 parts) carbonate compound. In at least some embodiments, the composition includes a ratio, by weight, of 1 part gluconate compound to 0.5 to 2 parts (or 0.8 to 1.4 parts) non-ionic preservative. In at least some embodiments, the composition includes a ratio, by weight, of 1 part gluconate compound to 0.5 to 3 parts (or 1.3 to 2.5 parts) citrate compound.

In at least some embodiments, the composition includes, by weight, 1 part gluconate compound; 4 to 10 parts carbonate compound; 0.5 to 2 parts non-ionic preservative; and 0.5 to 3 parts citrate compound. This composition may be aqueous. In other embodiments, the composition may be in dry form for dissolving in water.

The composition can include other non-essential components that do not contribute to the water conditioning. Such components can include dyes or scents. As an example, in some embodiments, Chromatint blue is added to color the resulting aqueous solution.

Preferably, when the composition is in aqueous form, all of the components of the composition are sufficiently dissolved so that there are no visible particles in the solution when observed by the unaided eye. More preferably, when the composition is in aqueous form, all of the components of the composition are completely dissolved.

The composition can be formed using any suitable process. In some embodiments, the components are added to water sequentially. For example, the components can be added in the following order: gluconate compound; carbonate compound; non-ionic preservative; phosphate buffer. In at least some of these embodiments, the two compounds of the phosphate buffer are added sequentially. Preferably, after each component is added the resulting solution is mixed well. For example, the solution may be stirred for a period of 1 to 10 minutes at each step.

In at least some embodiments, three fluid ounces (95 mL) of the aqueous composition can be used to treat 130 to 299 gallons (490 to 1132 liters) of water once per week. In at least some embodiments, four fluid ounces (125 mL) of the aqueous composition can be used to treat 300 to 500 gallons (1135 to 1892 liters) of water once per week. Increased frequency of addition at the same rate can increase the sensory feel of softness and olfactory freshness of the treated water. Other treatment amounts can be used to treat water. In at least some embodiments, the amount of composition can be reduced by 1 fluid ounce (32 mL) if bather load (two adults bathing for 20 minutes per use) is less than three times per week.

In one embodiment, a method of using the composition includes placing new or cleaned filters into the pool, spa, or hot tub; filling the pool, spa, or hot tub with water; heating the water to a desired temperature; adding chlorine or bromine to the water; and balancing the total alkalinity. Preferably, the water is within normal usage limits: pH 7.2 to 7.6; total alkalinity 80 to 120 ppm; total hardness 100 to 250 ppm; and Chlorine or Bromine 2 to 5 ppm; which can be determined by using an appropriate test strip.

In another embodiment, the water is within normal usage limits for saltwater systems: pH 7.2 to 7.6, total alkalinity 40 to 120 ppm, total hardness 25 to 75 ppm, and salt sanitizer 2 to 4 ppm, which can also be determined by using an appropriate test strip. The water conditioning composition as described herein can then be added to the water.

For many conventional water conditioners, a user should wait at least one day after adding the chlorine or bromine before adding the water condition. In at least some embodiments, the water conditioning composition described herein can be added within 10 minutes (or within 30 minutes, or within 1 hour) of adding the chlorine or bromine. In at least some embodiments, the pool, spa, or hot tub can be used within 10 minutes or 30 minutes after adding the water conditioning composition.

EXAMPLES

A first composition included 92.15 wt. % water, 0.85 wt. % sodium gluconate, 5 wt. % soda ash (sodium carbonate), 1 wt. % methylisothiazolinone (LINCOCIDE N), 1% sodium citrate, and 0.005 wt. % of a 1% stock solution (10 grams in 1000 ml water) of a stable blue dye such as Chromatint blue.

A first composition included 91.65 wt. % water, 0.85 wt. % sodium gluconate, 5 wt. % soda ash (sodium carbonate), 1 wt. % NEOLONE 950 (methylisothiazolinone), 1.50 wt. % sodium citrate, and 0.005 wt. % of a 1% stock solution (10 grams in 1000 ml water) of a stable blue dye such as Chromatint blue.

For each composition, the sodium gluconate was slowly added to the water and mixed well for about 5 minutes. The soda ash was added with the solution stirred at fast speed without air entrainment. The solution was mixed well and checked to ensure that all of the components were dissolved, and the solution was clear. LINCOCIDE N was then added slowly, and the resulting solution mixed well. Sodium citrate was then added, and the solution mixed well for 5 minutes. Finally, Chromatint blue solution was added for coloring.

The total alkalinity for the two compositions was in the range of 59% to 72% Na2O for 65 grams of the composition. The pH of the two compositions was in the range of 10.5±0.5. The Brix value was in the range of 10±1.

The above specification, examples and data provide a description of the manufacture and use of the composition of the invention. While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A conditioning composition for treating water of a pool, spa, or hot tub for bathing, the composition comprising:
    at least one gluconate compound;
    at least one carbonate compound;
    at least one citrate compound; and
    wherein the conditioning composition does not contain calcium, a metasilicate compound, a sulfate compound, or a phosphate compound, and wherein the conditioning composition consists essentially of 87-95 wt. % water, 0.5 to 1.5 wt. % of the at least one gluconate compound, 3 to 8 wt. % of the at least one carbonate compound, and 0.5 to 2.5 wt. % of the at least one citrate compound, and further includes 0.5 to 1.5 wt. % of a non-ionic preservative.

2. The conditioning composition of claim 1, wherein the at least one gluconate compound is selected from sodium gluconate, potassium gluconate, or any combination thereof.

3. The conditioning composition of claim 1, wherein the at least one carbonate compound is selected from sodium carbonate, sodium bicarbonate, potassium carbonate, or any combination thereof.

4. The conditioning composition of claim 1, wherein the citrate compound is selected from sodium citrate, potassium citrate or any combination thereof.

5. The conditioning composition of claim 1, wherein the at least one gluconate compound is sodium gluconate, the at least one carbonate compound is sodium carbonate, and the citrate compound is sodium citrate.

6. The conditioning composition of claim 1, wherein the non-ionic preservative is selected from methylisothiazolinone, methylchloroisothiazolinone, or any combination thereof.

7. The conditioning composition of claim 1, wherein the composition provides buffering in a pH range of at least 7 to 9.

8. The conditioning composition of claim 1, wherein the conditioning composition does not contain a silver compound.

9. The conditioning composition of claim 1, further comprising water.

10. The conditioning composition of claim 1, wherein the conditioning composition further comprises a dye or scent.

11. The conditioning composition of claim 1, wherein the conditioning composition comprises 1 part of the gluconate compound, 4 to 10 parts of the carbonate compound, and 0.5 to 3 parts of a citrate compound.

12. The conditioning composition of claim 11, wherein the conditioning composition further comprises 0.5 to 2 parts of a non-ionic preservative.

13. The conditioning composition of claim 1, wherein the conditioning composition comprises 1 part of the gluconate compound, 5 to 7 parts of the carbonate compound, and 1.3 to 2.5 parts of the at least one citrate compound.

14. The conditioning composition of claim 1, wherein the conditioning composition is an aqueous solution.

15. The conditioning composition of claim 1, wherein the conditioning composition is in a dry form.

16. A conditioning composition for treating water of a pool, spa, or hot tub for bathing, the composition comprising:
    at least one gluconate compound;
    at least one carbonate compound;
    at least one citrate compound; and
    wherein the conditioning composition does not contain calcium, a metasilicate compound, a sulfate compound, or a phosphate compound, and
    wherein the conditioning composition consists essentially of 89-93 wt. % water, 0.5 to 1.2 wt.% of the at least one gluconate compound, 4 to 6 wt. % of the at least one carbonate compound, and 0.5 to 2 wt. % of the at least one citrate compound, and further includes 0.7 to 1.2 wt. % of a non-ionic preservative.

17. A conditioning composition for treating water of a pool, spa, or hot tub for bathing, the composition comprising:
    at least one gluconate compound;
    at least one carbonate compound;
    at least one citrate compound; and
    wherein the conditioning composition does not contain calcium, a metasilicate compound, a sulfate compound, or a phosphate compound, and
    wherein the conditioning composition consists essentially of 87-95 wt. % water, 0.5 to 1.5 wt. % of the at least one gluconate compound, 3 to 8 wt. % of the at least one carbonate compound, and 1.0 to 2.5 wt.% of the at least one citrate compound, and further includes 0.5 to 1.5 wt. % of a non-ionic preservative.

* * * * *

UNITED STATES PATENT AND TRADEMARK OFFICE
CERTIFICATE OF CORRECTION

| | |
|---|---|
| PATENT NO. | : 12,049,414 B2 |
| APPLICATION NO. | : 17/529227 |
| DATED | : July 30, 2024 |
| INVENTOR(S) | : Colin Frank Taylor |

It is certified that error appears in the above-identified patent and that said Letters Patent is hereby corrected as shown below:

In the Claims

Column 5, Line 39, Claim 1 should read as follows:
1. A conditioning composition for treating water of a pool, spa, or hot tub for bathing, the composition comprising:
    at least one gluconate compound;
    at least one carbonate compound;
    at least one citrate compound; and
    wherein the conditioning composition does not contain calcium, a metasilicate compound, a sulfate compound, or a phosphate compound, and
    wherein the conditioning composition consists essentially of 87-95 wt.% water, 0.5 to 1.5 wt.% of the at least one gluconate compound, 3 to 8 wt.% of the at least one carbonate compound, and 0.5 to 2.5 wt.% of the at least one citrate compound, and further includes 0.5 to 1.5 wt.% of a non-ionic preservative.

Signed and Sealed this
Twenty-fourth Day of September, 2024

Katherine Kelly Vidal
*Director of the United States Patent and Trademark Office*